Nov. 10, 1964  J. L. POAGE  3,156,216
LIVESTOCK OILER
Filed April 3, 1963  5 Sheets-Sheet 1
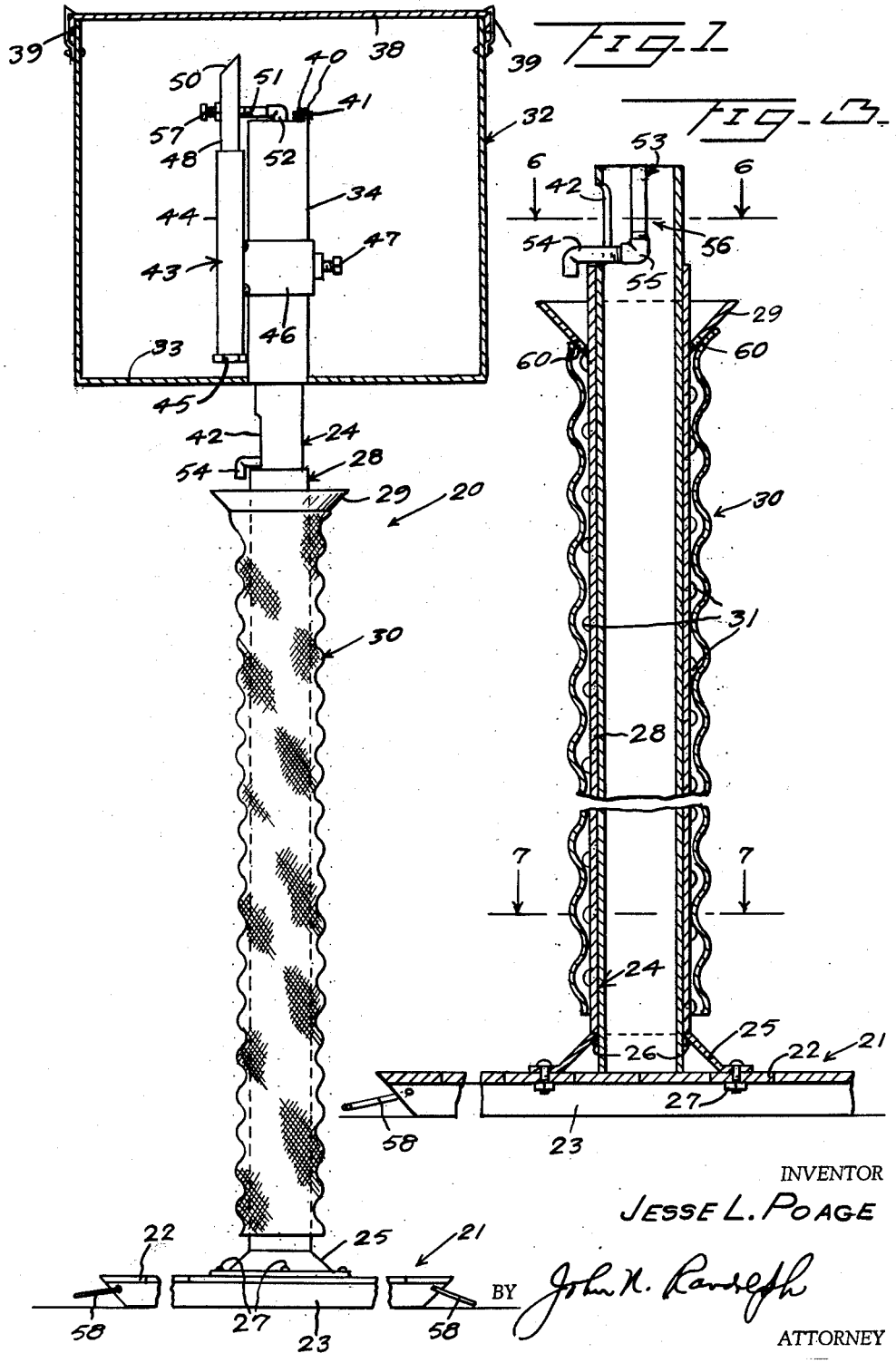
INVENTOR
JESSE L. POAGE
BY John N. Randolph
ATTORNEY

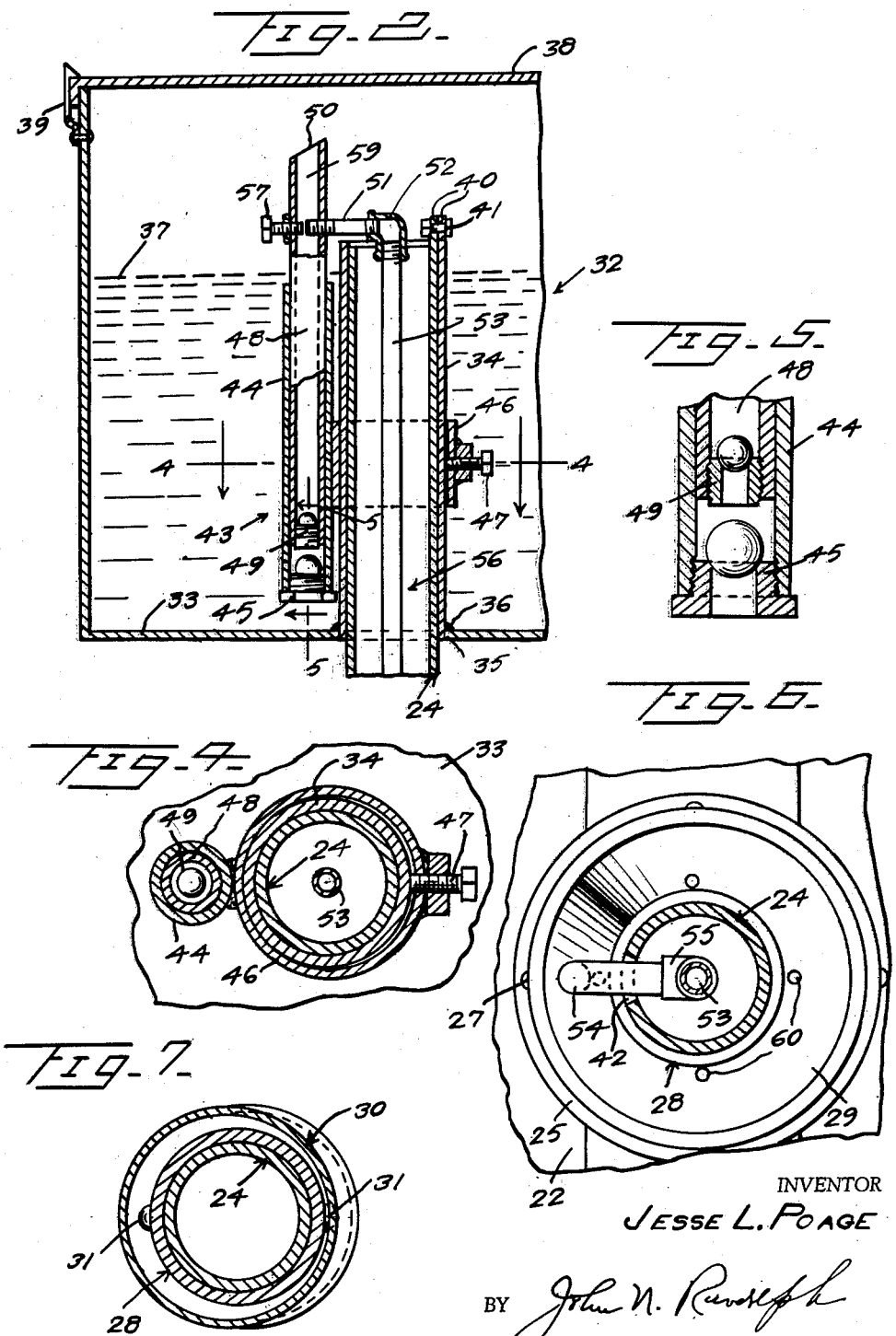

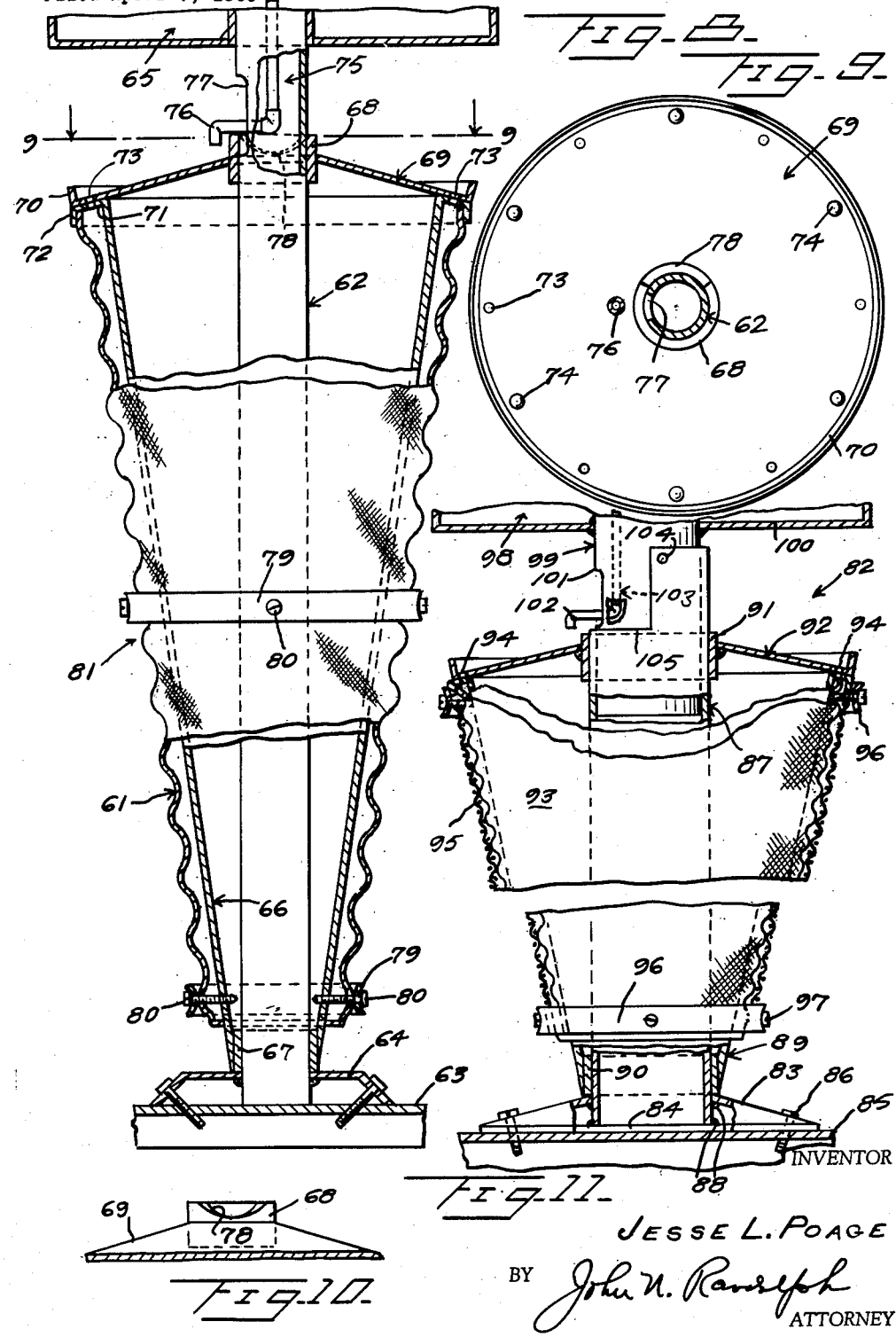

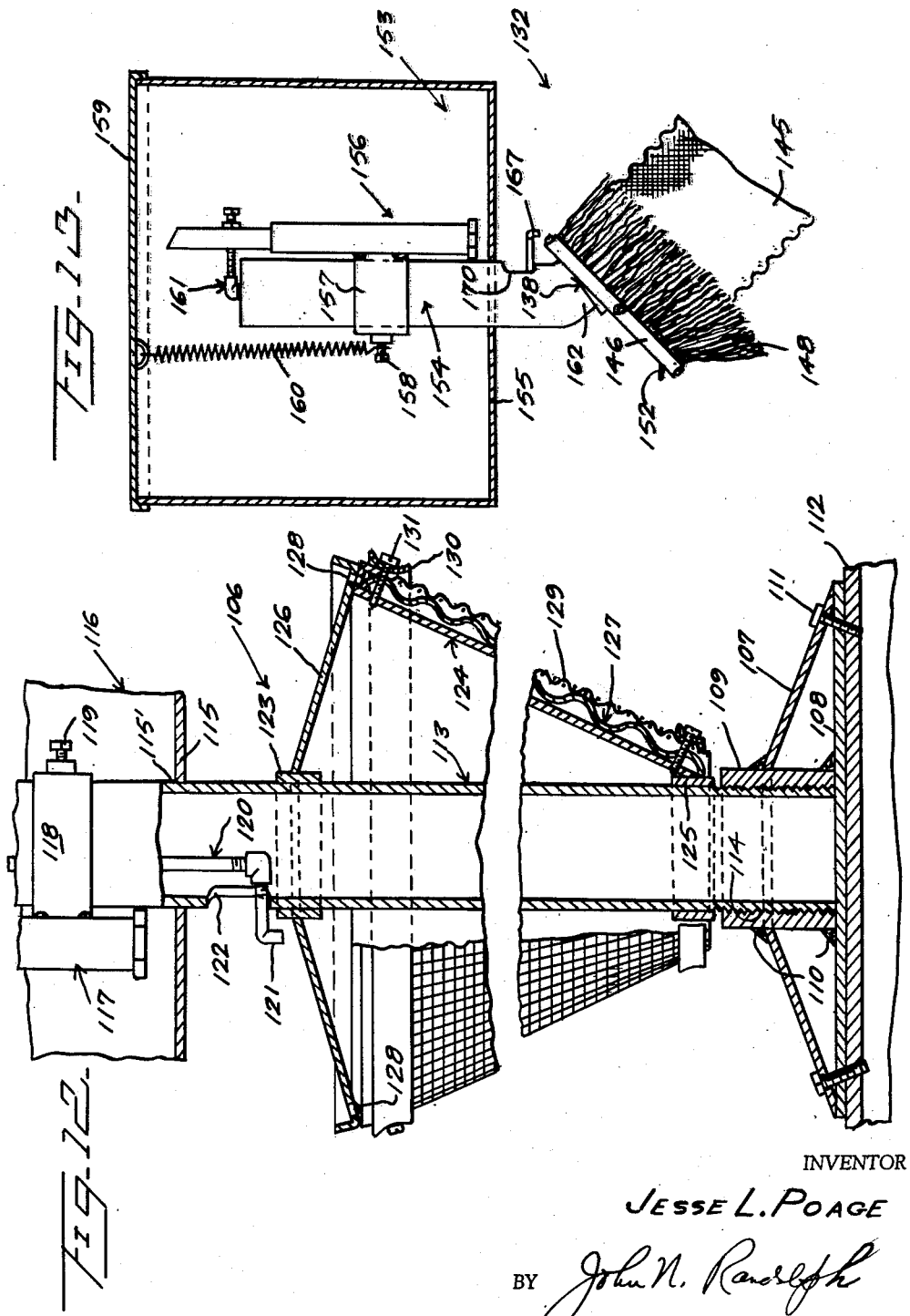

Nov. 10, 1964  J. L. POAGE  3,156,216
LIVESTOCK OILER
Filed April 3, 1963  5 Sheets-Sheet 5
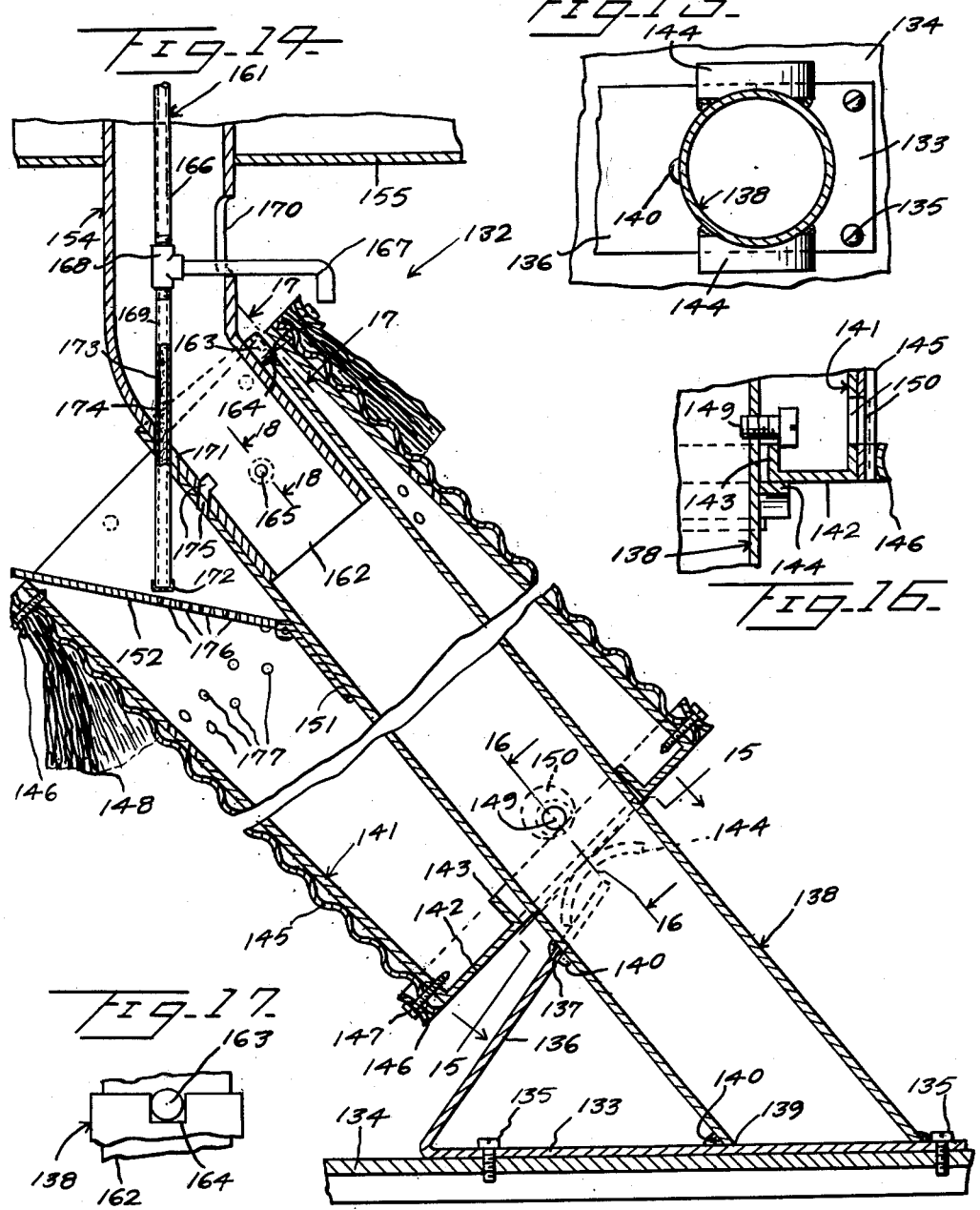
INVENTOR
JESSE L. POAGE
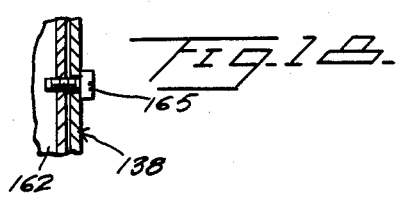
ATTORNEY

# United States Patent Office 3,156,216
Patented Nov. 10, 1964

3,156,216
LIVESTOCK OILER
Jesse L. Poage, Perry, Mo.
Filed Apr. 3, 1963, Ser. No. 270,417
6 Claims. (Cl. 119—157)

This invention relates to a novel device for applying oil or other liquids to livestock such as hogs and cattle, and more particularly to a device which is actuated by the animal brushing or rubbing against an applicator element of the device for actuating a pump which supplies an oil or liquid to the applicator element.

More particularly, it is an object of the present invention to provide a livestock oiler wherein the amount of liquid supplied to the applicator element will be effectively metered and wherein the oil will continue to be supplied to the applicator element when the pump is not in operation, so that the absorbent applicator element will be maintained saturated with the oil or liquid for application to the skin of the animal when it initially rubs or brushes against the applicator element.

Still another object of the invention is to provide a livestock oiler wherein the applicator element is capable of moving relative to a support thereof when contacted by an animal and which movement effects operation of a pump which supplies the oil or other liquid from a reservoir to the applicator element.

Still another object of the invention is to provide a livestock oiler wherein the applicator element is so constructed and arranged that the oil or liquid will be applied to a substantial area of the animal's skin.

Various other objects and advantages of the invention will hereinafter become more fully apparent from the following description of the drawings, illustrating presently preferred embodiments thereof, and wherein:

FIGURE 1 is a side elevational view, partly in section and partly broken away, of one embodiment of the livestock oiler;

FIGURE 2 is an enlarged fragmentary vertical sectional view, partly in elevation, of a portion thereof;

FIGURE 3 is a view similar to FIGURE 2 of another portion of the livestock oiler;

FIGURE 4 is an enlarged cross sectional view of a part of the livestock oiler, taken substantially along a plane as indicated by the line 4—4 of FIGURE 2;

FIGURE 5 is an enlarged fragmentary longitudinal sectional view, taken substantially along a plane as indicated by the line 5—5 of FIGURE 2;

FIGURES 6 and 7 are enlarged cross sectional views through parts of the livestock oiler, taken substantially along planes as indicated by the lines 6—6 and 7—7, respectively, of FIGURE 3;

FIGURE 8 is an enlarged fragmentary vertical sectional view, partly in elevation, similar to FIGURE 3, showing a modification of the livestock oiler;

FIGURE 9 is a cross sectional view thereof taken substantially along a plane as indicated by the line 9—9 of FIGURE 8;

FIGURE 10 is a fragmentary side elevational view of a portion of the structure illustrated in FIGURES 8 and 9.

FIGURE 11 is an enlarged fragmentary vertical sectional view, partly in elevation, illustrating a second modification of the livestock oiler;

FIGURE 12 is an enlarged fragmentary vertical sectional view, partly in elevation, illustrating a third modified form of the livestock oiler;

FIGURE 13 as a fragmentary vertical sectional view, partly in elevation, showing the upper portion of a fourth modification of the livestock oiler;

FIGURE 14 is a fragmentary vertical sectional view, partly in elevation, illustrating the lower part of said fourth modification and on an enlarged scale relative to FIGURE 13;

FIGURE 15 is a fragmentary sectional view taken substantially along the line 15—15 of FIGURE 14;

FIGURE 16 is an enlarged fragmentary sectional view, taken substantially along the line 16—16 of FIGURE 14;

FIGURE 17 is a fragmentary view taken substantially along the line 17—17 of FIGURE 14, and FIGURE 18 is a fragmentary sectional view taken substantially along a plane as indicated by the line 18—18 of FIGURE 14.

Referring more specifically to the drawings and first with reference to FIGURES 1 through 7, the livestock oiler as illustrated therein is designated generally 20 and includes a sled-type base, designated generally 21, composed of a platform 22 which is supported on runners 23.

The lower end of a rigid pipe or tube 24 rests upon the central portion of the platform 22 and is held rigidly with respect thereto and in an upright position by an anchoring collar 25 which is disposed around the pipe 24 and welded or otherwise secured thereto, as seen at 26, and which collar is secured by nut and bolt fastenings 27 to the platform 22.

A rigid sleeve or tube 28 fits turnably and slidably on the pipe 24 and has a lower end resting on the collar 25. A frusto-conical flange 29 is secured around the tube 28 near the upper end of said tube and combines therewith to form an annular receptacle or trough. A prefabricated tube or sleeve 30 of felt, hemp, or other absorbent material is disposed around the tube 28 and has an upper end bearing against or disposed directly below the flange 29. The tube or sleeve 30 is substantially rigid and is preferably of undulating configuration, as illustrated in FIGURES 1 and 3. The exterior of the tube 28 is provided with protuberances 31 which are disposed within the applicator element 30 and which support said applicator element 30 on the tube 28 and limit the movement thereof relative to said tube.

A reservoir, designated generally 32, has a bottom 33. The lower end of a pipe 34 is secured in a central opening 35 of the bottom 33, in sealed engagement therewith, as by welding, as seen in FIGURE 2 at 36, to prevent leakage of oil or other liquid 37 from the reservoir 32 around the pipe 34. The reservoir 32 has a removable flanged lid 38 for replenishing the liquid 37 in said reservoir, and which lid is normally held applied by spring latches 39. The pipe 34 fits telescopically over the upper end of the pipe 24 and said pipes 24 and 34 are provided with aligned upstanding apertured lugs 40 at their upper ends to receive a nut and bolt fastening 41 for securing the pipe 34 to the pipe 24 for thus demountably supporting the reservoir 32 on said pipe 24, above and spaced from the upper end of the tube 28, as seen in FIGURE 1. The portion of the pipe 24 which is disposed between the tube 28 and reservoir 32 is provided with a longitudinally extending slot 42, the lower end of which is disposed substantially flush with the upper end of the tube 28.

A pump, designated generally 43, is mounted in the reservoir 32 on the pipe 34 and includes a pump barrel or cylinder 44 having an upwardly opening check valve 45 at its lower end. A collar 46 is secured externally to the barrel 43 and fits slidably over the pipe 34. A setscrew 47 is threaded radially through a part of the collar 46 and is tightened against the pipe 34 for supporting the pump 43 adjustably on the pipe 34. A tubular piston 48 is slidably mounted in the barrel 44 and has an upwardly opening check valve 49 at its lower end. The piston 48 extends above the upper end of the barrel 44 and terminates above the upper ends of the pipes 24 and 34 in an angularly cut open upper end 50 which is inclined downwardly and away from the pipes 24 and 34. A pipe 51 has one end threaded into the piston 48 above the upper ends of the pipes 24 and 34 and an opposite end which is threadably connected to one end of an elbow coupling 52. The other end of the elbow coupling 52 is threadedly connected to one end of a pipe or tube 53 which extends downwardly through the upper portion of the pipe 24. As seen in FIGURE 3, a bib 54 extends through the slot 42 and is threadedly connected to an elbow coupling 55 which is also threadedly connected to the lower end of the pipe 53. The pipes 51 and 53, couplings 52 and 55, and bib 54 form the pump rod and outlet conduit, designated generally 56, of the pump 43. A setscrew 57 is threaded radially into the piston 48 in alignment with the pipe 51 and may be adjustably spaced from the end of the pipe 51 which opens into the piston 48, to provide a metering valve.

The platform 22 of the base 21 is preferably about six feet square or large enough so that an animal must stand on said platform to rub against the applicator element 30, so that the animal will not tend to overturn the oiler 20. The base 21 is preferably provided with loops 58 at the ends of its runners 23, by means of which the oiler 20 can be moved about on its base 21.

The oiler 20 is primarily adapted to be used by hogs and pigs who in scratching themselves on the applicator element 30 generally have a tendency to rub or scratch upwardly or downwardly. When the animal, not shown, brushes upwardly on or against the applicator element 30, said applicator element and the sleeve 28 will be displaced upwardly on the pipe 24 for causing the upper end of the sleeve 28 to engage against and displace the bib 54 upwardly. This will raise the pump rod 56 and the pump piston 48 for drawing oil or other liquid 37 into the barrel 44 through the check valve 45. When the upward displacing force is removed from the applicator element 30, said applicator element and the sleeve 28 will slide downwardly and the pump piston 48 and the pump rod 56 will also move downwardly by gravity. During downward travel of the piston 48, the oil contained in the barrel 44 will pass through the check valve 49 into the piston 48. The piston 48 will normally be maintained filled with oil or other liquid 37 to above the level of the pipe 51 and the portion of the piston 48, disposed between the upper end 50 thereof and the pipe 51 forms a reserve chamber 59 for supplying oil or liquid 37 to the conduit 56 when the pump 43 is not in operation. Any excess liquid will overflow from the open upper end 50 of the piston 48 and away from the open upper ends of the pipes 24 and 34. The amount of oil or liquid passing downwardly through the conduit 56 is regulated by adjustment of the metering valve 57. The liquid in the conduit 56 discharges from the bib 54 into the trough 29 which has drainage openings 60 through which the oil discharges into the applicator element 30 to maintain said element saturated with oil. Thus, when an animal initially brushes against the applicator element, oil therefrom will be applied to the skin of the animal, and the animal in actuating the pump 43, as heretofore described, will replenish the chamber 59, so that it can keep the applicator element saturated with oil after the animal has ceased brushing against said applicator element and displacing it upwardly. It will also be apparent that the applicator element 30 and sleeve 28 can rotate on the pipe 24 when contacted by an animal, so that different circumferentially spaced portions of the applicator element will be brought into contact with the hide of the animal for applying the oil or liquid 37 thereto.

FIGURES 8, 9 and 10 illustrate a modification of the invention wherein a preformed applicator element, designated generally 61, is substituted for the applicator element 30. The applicator element 61 differs from the applicator element 30 only in that it is frusto-conical shaped and tapers downwardly. A pipe 62, corresponding to the pipe 24, is mounted centrally on a base platform 63, corresponding to the platform 22, by a collar 64. A reservoir 65, only partially shown, corresponds to the reservoir 32 and is supported in the same manner on th pipe 62 as the reservoir 32 is supported by the pipe 24. The pump contained in the reservoir 65, not shown, corresponds to the pump 43. A frusto-conical member 66 replaces the sleeve 28 and is disposed within the applicator element 61. The lower end of the member 66 is secured to a collar 67 which bears on the base 64 and swivelly engages the pipe 62. A collar 68 fits rotatively on the pipe 62 beneath and adjacent the reservoir 65. An annular apron 69 is secured around the collar 68 and extends outwardly and downwardly at an incline therefrom and has an upturned annular rim 70 at its periphery. The member 66 has an outwardly and downwardly inclined annular flange 71 at its upper end which bears against the underside of the outer portion of the apron 69 and which has a downturned lip 72 at its periphery, against the inner side of which the upper end of the applicator element 61 bears. The flange 71 and the portion of the apron 69, disposed thereabove, are provided with circumferentially spaced aligned openings 73, alternate ones of which receive nut and bolt fastenings 74 for securing the member 66 to the apron 69 for supporting said apron and the collar 68 on the member 66. The unoccupied registering openings 73 constitute drain ports, as will hereinafter become apparent.

An outlet conduit and pump rod 75, corresponding to the outlet conduit and pump rod 56, has a bib 76, corresponding to the bib 54, which projects outwardly through a longitudinal slot 77 of the pipe 62, which is disposed below the reservoir 65. The slot 77 replaces the slot 42 and has a lower end extending downwardly below the upper edge of the collar 68 to approximately the level of the bottommost part of an arcuate recess 78 which is formed in a portion of the upper edge of the collar 68, as best seen in FIGURE 10. The pump rod 75 is shown in FIGURE 8 supported on the upper edge of the collar 68 in a partially raised position.

Two or more rings 79, preferably of metal, fit around the applicator element 61 and are secured thereto by screws 80 which extend through said applicator element and are anchored in the member 66.

The livestock oiler 81, as illustrated in FIGURES 8, 9 and 10, is primarily adapted for use by cattle. The frusto-conical shape of the applicator element 61 will cause the oil or liquid to be distributed over a greater area of the animal's hide including the animal's back as well as its sides. An upward pressure exerted on the applicator element 61 by the animal will cause said applicator element to move upwardly carrying with it the member 66, apron 69 and collars 67 and 68. The collar 68 by engagement with the bib 76 will displace the pump rod 75 upwardly for actuating the pump in the same manner as heretofore described in reference to the operation of the oiler 20 of FIGURES 1 to 7. The oil or other liquid discharged from the bib 76 will flow down the apron 69 and through the exposed drain ports 73 onto the inner side of the applicator element 61, to maintain said element saturated.

However, cattle will more frequently rub the applicator element 61 in a manner to cause it to rotate on the pipe 62 with the collars 67 and 68 and the apron 69. During each revolution of the collar 68 its recessed portion 78 will move under the bib 76 allowing the pump rod 75 to slide downwardly and then be displaced upwardly, as the bib 76 follows the contour of the recess 78, which thus forms a cam surface. Thus, the pump will be operated either by reciprocation or rotation of the applicator element 61.

FIGURE 11 illustrates a second modified form of the livestock oiler, designated generally 82, and wherein attaching collar 83 has a bottom plate 84 which rests directly on a base platform 85, which base platform corresponds to the platform 22. The collar 83 and its base 84 is secured by fastenings 86 to the platform 85. A pipe 87, which replaces the pipe 24, has its lower end resting on the base plate 84 and is secured thereto and within the collar 83 by soldering or welding, as indicated at 88. A frusto-conical member 89, corresponding to the member 66, is secured at its lower rtstricted end to a collar 90 which engages slidably and rotatively on the pipe 87 and normally rests upon the attaching collar 83. A collar 91 is slidably and rotatively disposed on the upper portion of the pipe 87 and has an apron 92 extending outwardly and downwardly therefrom, corresponding to the apron 69, and which is secured to the upper end of the member 89 in the same manner that the apron 69 is secured to the member 66. An applicator element 93, corresponding to the applicator 61, is disposed around the member 89, and oil is supplied thereto through drainage ports 94, corresponding to the drainage ports 73. A frusto-conical sheath or casing 95 of foraminous sheet metal material, heavy wire screening or the like, fits conformably around the applicator element 93, and said member 95 and the applicator element 93 are secured to one another and to the supporting member 89 by metal bands 96 and screw fastenings 97. The collar 91 differs from the collar 68 in that it is not provided with a cam surface.

The reservoir 98 of the oiler 82 and the parts contained therein, not shown, correspond with the reservoir 32 and its contents, except that a pipe 99 of the reservoir 98, which replaces the pipe 34, extends downwardly from the reservoir bottom 100 and fits telescopically into the upper portion of the pipe 87. The pipe 99, between the bottom 100 and collar 91, has a longitudinal slot 101 to accommodate vertical sliding movement of a bib 102 of a pump rod 103 which corresponds to the pump rod 56. The pipe 99 is secured to the pipe 87 by a screw fastening 104 for supporting the reservoir 98 and its contents on the pipe 87. The upper portion of the pipe 87 has a substantially semicircular notch 105 in which the slot 101 is disposed.

The oiler 82 is operated in the same manner as the oiler 20 by up and down movement of the parts 89–97 as a unit on the pipe 87 for operating the pump rod 103 for supplying oil to the applicator element 93. The foraminous sheath 95 provides a coarse rough surface which is attractive to animals as a scratching surface, and is sufficiently porous so that the oil or liquid will readily pass therethrough from the applicator element 93 for application to the hide of the animal.

FIGURE 12 illustrates a third modification of the livestock oiler, designated generally 106, and wherein an attaching collar 107 has a bottom plate 108 and a centrally disposed internally threaded pipe coupling 109 which is welded or otherwise secured as seen at 110 to the parts 107 and 108, which parts are secured by fastenings 111 to a platform 112, corresponding to the platform 22. A pipe 113 replaces the pipes 87 and 99 and has an externally threaded lower end 114 which is threadedly secured in the coupling 109, and an upper part which extends through and is sealed in a central opening 115' of the bottom 115 of a reservoir 116, which otherwise corresponds to the reservoir 32. The upper end of the pipe 113, not shown, terminates the same distance above the bottom 115 as the pipe 34 terminates above the bottom 33. A pump 117, corresponding to the pump 43, is secured within the reservoir 116 on the pipe 113 by a collar 118 and setscrew 119, corresponding to the collar 46 and setscrew 47, respectively. The combined pump rod and supply conduit 120 of the pump 117, which corresponds to the pump rod 56, extends downwardly through the pipe 113 and the bib 121 thereof extends outwardly through a vertically elongated slot 122 of the pipe 113, which is located between the reservoir 116 and a collar 123, corresponding to the collar 91. The remaining parts 124, 125, 126, 127, 128, 129, 130 and 131 of the oiler 106, correspond with the parts 89, 90, 92, 93, 94, 95, 96 and 97, respectively, of the oiler 82. The operation of the oiler 106 is identical with the operation of the oiler 82.

FIGURES 13 to 18 disclose a fourth modification or fifth embodiment of the livestock oiler, designated generally 132, and which includes a mounting plate 133 which rests upon a platform 134, corresponding to the platform 22, and is secured thereto by fastenings 135. The plate 133 has an upwardly and inwardly inclined end 136 the upper edge of which is arcuately recessed as seen at 137. A pipe 138 has a beveled lower end 139 which rests upon the plate 133. A portion of the pipe 138 engages in the notched portion 137 and is secured thereto by welds or the like 140. Additional welds 140 secure the end 139 to the plate 133 so that the pipe 138 is supported at an incline.

A rigid cylinder 141 is disposed around the upper portion of the pipe 138 and has an inturned annular flange 142 at its lower end, which flange is provided with an upturned annular collar 143 at its inner edge. The collar 143 fits loosely around the pipe 138. Bars 144 are secured to the extension 136 and straddle the pipe 138, as seen in FIGURE 15. The bars 144 are upwardly bowed and portions of the annular flange 142 rest on the convex upper surfaces of said bars, as seen in FIGURE 14. The cylinder 141 is substantially larger in diameter than the pipe 138 and a portion of the upper end thereof bears against the upper side of the upper end of the pipe 138, so that the cylinder is normally disposed at an incline relative to the pipe 138, as seen in FIGURE 14. A cylindrical applicator element 145 is disposed around the cylinder 141 and is secured thereto by metal bands 146 and screws 147. The applicator element 145 is preferably of the same preformed construction and undulating contour as the applicator element 30. A fringe 148 has an upper edge disposed around the upper portion of the applicator element 145 and which is anchored under the upper band 146. Said fringe is formed of a multiplicity of individual absorbent strands.

As seen in FIGURE 16, a headed screw 149 is threaded radially into a part of the pipe 138 and engages over a portion of the collar 143 to retain the annular flange 142 in contact with the bars 144. The cylinder 141 and element 145 are provided with aligned openings 150 to receive a screwdriver or other tool for applying or removing the retaining screw 149. Said screw 149 is disposed at one side of the pipe 138 and is spaced slightly from the collar 143 so as not to interfere with rocking movement of the cylinder 141 and applicator element 145 relative to the pipe 138, as will hereinafter be described.

A hinge leaf 151 is secured to the outer surface of the underside of the pipe 138, and the other leaf 152, which is pivotally connected to the upper end of the leaf 151, extends upwardly and outwardly therefrom and bears, adjacent its free end, on the lower portion of the upper edge of the cylinder 141 by which said hinge leaf 152 is supported.

Referring to FIGURE 13, the oiler 132 includes a reservoir 153. A pipe 154 extends centrally through the reservoir bottom 155 and is secured therein in sealed engagement with said bottom. The upper portion of the pipe 154 terminates in the upper part of the reservoir 153. A pump 156 is supported in the reservoir 153 on the pipe 154 by a collar 157 and setscrew 158, corresponding to the collar 46 and setscrew 47, respectively. A flanged lid 159 of the reservoir 153 is held in an applied position by a contractile spring 160 which is secured to the underside thereof and to the setscrew 158. The pump 156 corresponds to the pump 43 except as to the pump rod and outlet conduit 161, which will hereinafter be described.

The pipe 154 extends downwardly from the reservoir bottom 155 and has an angularly disposed lower portion 162 which fits in the upper portion of the pipe 138. An external lug 163 on the angular pipe portion 162 seats in a notch 164 in the upper end of the pipe 138, as seen in FIGURE 17, and when the pipes 154 and 138 are thus connected, the reservoir bottom 155 is disposed in substantially a horizontal plane parallel to the platform 134, as seen in FIGURE 14. A screw 165, as best seen in FIGURE 18, extends loosely through a part of the pipe 138 and threadedly engages in a part of the angular extension 162 for holding the pipe 154 rigid relative to the pipe 138.

The pump rod and outlet conduit 161 includes a pipe section 166, corresponding to the pipe 53. A bib 167 is connected to the lower end of the pipe 166 by a T-coupling 168 which replaces the elbow coupling 55. A pipe 169 is connected to the lower end of the coupling 168 and forms a straight extension of the pipe 166. The bib 167 extends outwardly through a longitudinal slot 170 in the part of the pipe 154 which is disposed between its angular end 162 and the reservoir 153. The bib 167 discharges onto the uppermost portion of the fringe 148.

The pipe 169 extends downwardly and outwardly through aligned slots 171 in the pipe 138 and extension 162 and is provided at its lower end with an apertured cap 172 which is disposed immediately above an intermediate portion of the hinge leaf 152. The pipe 169 is filled with felt or other wick material 173. The pipe 169 is provided with an outlet port 174 which is disposed within the pipe 154 from which some oil from the reservoir 153 and pump 156 will escape for lubricating a portion of the pipe 169 which slides in the openings 171. Oil will also escape from the cap 172 for lubricating the exterior of said cap and the part of the hinge leaf 152 which is engaged thereby. The pipe 138 and pipe end 162 are provided with registering arcuate downwardly inclined slots 175 through which oil from the port 174, not escaping through the openings 171, can escape onto the hinge leaf 152. The slots 175 are disposed below the openings 171. The lower portion of the hinge leaf 152 is provided with openings 176 for the escape of oil received on said hinge leaf from either the port 174 or the cap 172. The cylinder 141 is preferably provided with rings of spaced openings 177, certain of which are always disposed below the openings 176, so that oil escaping through the openings 176 will escape through the openings 177 for saturating the applicator element 145.

The oiler 132 is primarily intended for use by cattle who rub against the underside of the applicator element 145 and in so doing will apply oil to their back and one side. The animal in rubbing against the applicator element 145 will cause said element and the cylinder 141 to rock clockwise, as seen in FIGURE 14, relative the pipe 138, the flange 142 rocking on the arcuate bars 144. The upward rocking or oscillating movement of the cylinder 141 will cause the hinge leaf 152 to swing upwardly toward the upper end of the pipe 138 and by contact with the cap 172 will displace the pump rod 161 upwardly. When the animal moves out of contact with the applicator element 145, said element and the cylinder 141 and hinge leaf 152 will swing downwardly and back to their positions of FIGURE 14 to permit the pump rod 161 to move downwardly by gravity. This up and down movement of the pump rod 161 will cause oil to be conveyed therethrough from the pump 156, in the same manner as heretofore described in reference to the pump 43 and pump rod 56. The major portion of the oil passing downwardly through the outlet conduit 161 will be discharged from the bib 167 onto the fringe 148 and through said fringe onto the applicator element 145 for saturating said applicator element and the fringe. The animal or animals in brushing or rubbing against the applicator element 145 will cause said element and the cylinder 141 to revolve around the pipe 138 to bring the more saturated portion or portions of said applicator element into lowermost positions to be contacted by the animal. Rotation of the applicator element and cylinder 141 will also effect rotation of the fringe 148 which in brushing across the face of the animal will apply an oil or liquid thereto to protect the animal's face from flies and for brushing flies from the face of the animal. Thus, the applicator element 145 of the oiler 132 has an oscillating and rotating movement about different axes and its oscillating or rocking motion, caused by contact of an animal therewith, operates the pump by which the oil or other liquid medicament is supplied from the reservoir 153 to the applicator element 145 and fringe 148.

Various other embodiments or modifications are contemplated and may be resorted to, without departing from the function or scope of the invention as hereinafter defined by the appended claims.

I claim as my invention:

1. A livestock oiler comprising a reservoir adapted to contain oil, a post on which said reservoir is supported, an applicator element movably supported on the post below the reservoir and adapted to be moved relative to the post by an animal brushing against said applicator element, a pump adapted to dispense the oil from the reservoir including a reciprocating pump rod, means engaging the pump rod and actuated by the applicator element for operating the pump in response to movement of the applicator element, means adapted to convey oil from the pump to said applicator element, said post including an inclined portion on which said applicator element is disposed, and means mounting said applicator element on the post for rocking movement relative thereto, said first mentioned means comprising a member pivotally connected to said post for vertical swinging movement and having a part, spaced from the pivot thereof, engaging on a part of the applicator element and another part, spaced from said pivot, engageable with the pump rod for actuating the pump rod when said member swings in response to rocking movement of the applicator element.

2. A livestock oiler as in claim 1, said last mentioned means supporting the applicator element rotatively on the post.

3. A livestock oiler comprising a reservoir adapted to contain oil, a post on which said reservoir is supported, an applicator element movably supported on the post below the reservoir and adapted to be moved relative to the post by an animal brushing against said applicator element, a pump adapted to dispense the oil from the reservoir including a reciprocating pump rod, means engaging the pump rod and actuated by the applicator element for operating the pump in response to movement of the applicator element, means adapted to convey oil from the pump to said applicator element, a pipe having a portion extending through and sealed to a bottom part of the reservoir and including an upper end disposed in the upper part of said reservoir, said post being tubular and having an upper part telescopically interfitting with and secured to said pipe, said pump rod being reciprocably disposed in said post and pipe and having a lower end protruding outwardly from a part of the post and engaging said means actuated by the applicator element, said pump including a piston, and said pump rod having an upper end connected to said piston above the upper end of said pipe.

4. A livestock oiler as in claim 3, said pump rod being tubular and constituting a part of said means for conveying the oil from the pump to the applicator element, said pump piston being tubular and being in communication with said pump rod.

5. A livestock oiler as in claim 4, said pump piston having an open upper end and including a portion disposed above the connection of the pump rod thereto for storing oil to be dispensed when the pump is not in operation, and a metering valve for regulating the amount of oil passing through the pump rod.

6. A livestock oiler comprising a reservoir adapted to contain oil, a post on which said reservoir is supported, an applicator element movably supported on the post below the reservoir and adapted to be moved relative to the post by an animal brushing against said applicator element, a pump adapted to dispense the oil from the reservoir including a reciprocating pump rod, means engaging the pump rod and actuated by the applicator element for operating the pump in response to movement of the applicator element, means adapted to convey oil from the pump to said applicator element, a pipe having a portion extending through and sealed to a bottom part of the reservoir and including an upper end disposed in the upper part of said reservoir, said post being tubular and having an upper part telescopically interfitting with and secured to said pipe, said pump rod being reciprocably disposed in said post and pipe and having a lower end protruding outwardly from a part of the post and engaging said means actuated by the applicator element, said pump including a piston, said pump rod having an upper end connected to said piston above the upper end of said pipe, and means adjustably mounting the pump on said pipe within the reservoir.

References Cited in the file of this patent
UNITED STATES PATENTS

| | | |
|---|---|---|
| 1,256,828 | Perry | Feb. 19, 1918 |
| 1,390,611 | Haisley | Sept. 13, 1921 |
| 2,888,906 | Delp | June 2, 1959 |
| 2,988,052 | Hesse | June 13, 1961 |